June 26, 1956  R. R. DENMAN  2,751,715
MOLD COOLING SYSTEM
Filed July 30, 1954  2 Sheets-Sheet 2
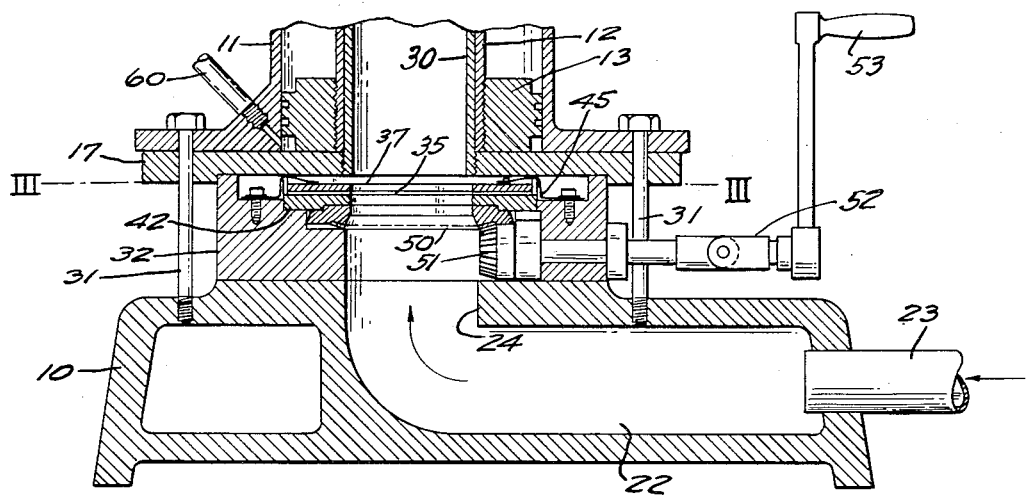
FIG. 2.
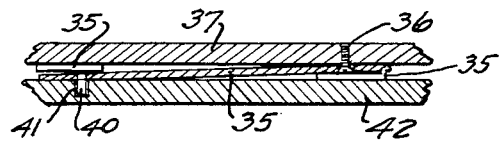
FIG. 5.
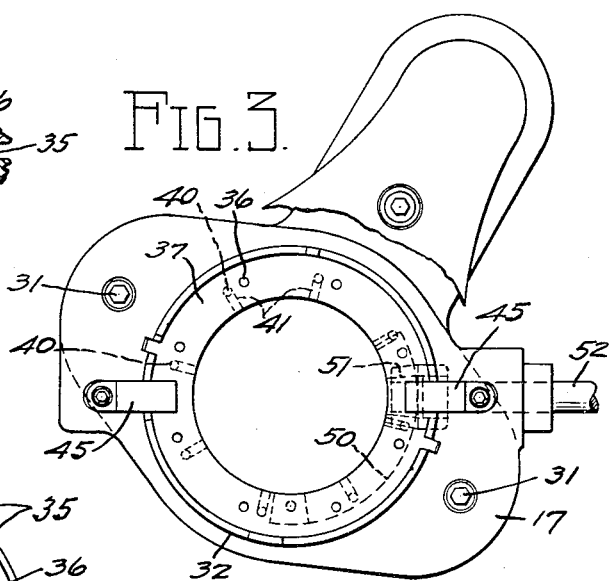
FIG. 6.
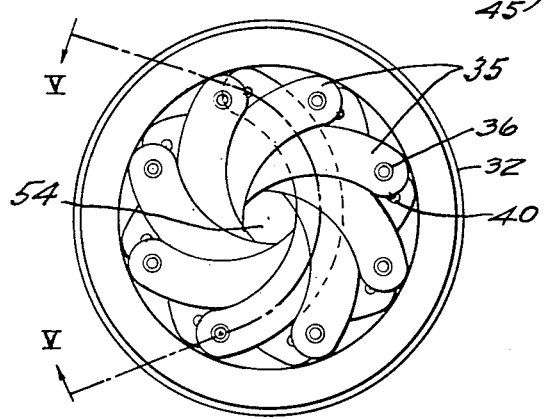
FIG. 4.
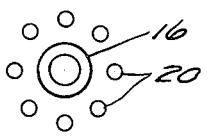
INVENTOR.
Robert R. Denman
BY W. A. Schaich
Leonard S. Donbier

United States Patent Office 2,751,715
Patented June 26, 1956

2,751,715

MOLD COOLING SYSTEM

Robert R. Denman, Columbus, Ohio, assignor to Owens-Illinois Glass Company, a corporation of Ohio Application July 30, 1954, Serial No. 446,709

4 Claims. (Cl. 49—40)

My invention relates to a structure for the cooling system of a glass article forming machine and in particular to such a machine wherein cooling air or fluid is utilized at velocities and in volume considerably in excess of that utilized in the normal glass forming processes.

In the modern glass forming machines, for example of the press and blow type, where the production of articles per mold cavity per minute is of the order of from twenty to thirty articles, it is a requisite that the temperature of the press mold be held highly constant and controlled in its various zones of cooling throughout its glass contacting surface areas. Such control provides the ultimate in the ultimately required distribution of glass throughout the walls of the subsequently blown article.

As a consequence of the rigidity and accuracy of such temperature control it is necessary to provide fluid control means which when adjusted will not disturb or change the flow distribution pattern of the cooling medium to a mold, and also one which will permit obtaining and maintaining a balance in the cooling of several similar molds on a single forming machine.

Adjustment of the flow of a cooling medium through the use of the usual gate or butterfly type of dampers definitely results in uncontrolled changes in the flow distribution pattern in the ducts as well as a change in the total flow. With such dampers a balance in the cooling of the glass contacting surface area of a single mold is difficult, if not impossible, of attainment and this is also true as between a series of molds mainly because such dampers will localize the flow of coolant along one side of a duct.

The primary object of this invention is the provision of an adjusting valve in the duct of a cooling system which will permit regulation of the volume of flow of a coolant without any of the usual localizing of the flow but conversely, the full flow thereof through the entire duct system.

Thus, for example, in a system for applying a cooling fluid to a mold upon and throughout its outer circumferential areas, through the use of a series of cooling nozzles, the volume flow of air to the group of nozzles may be adjusted without adversely affecting the volume of flow to any individual nozzle. Thus, a balance in the cooling of the mold walls may be obtained and maintained.

Under such circumstance it is then possible, where a series of molds are producing the same article, to obtain a balance of cooling as between the several molds and to obtain identical production from each mold both as to quality and as to articles per mold cavity per minute.

Other objects will be apparent from the following descriptive matter.

In the drawings:

Fig. 2 is a sectional elevational view in cross-section showing the control valve structure and its adjusting mechanism;

Fig. 3 is a plan view of the valve taken at line III—III on Fig. 2;

Fig. 4 is a plan view showing the positioning and relationship of the adjusting blades of the fluid control valve;

Fig. 5 is a sectional view taken at line V—V on Fig. 4 showing the arrangement of the adjusting blades of the valve; and Fig. 6 is a plan view showing diagrammatically the location and arrangement of the cooling nozzles and the mold.

Figure 1:
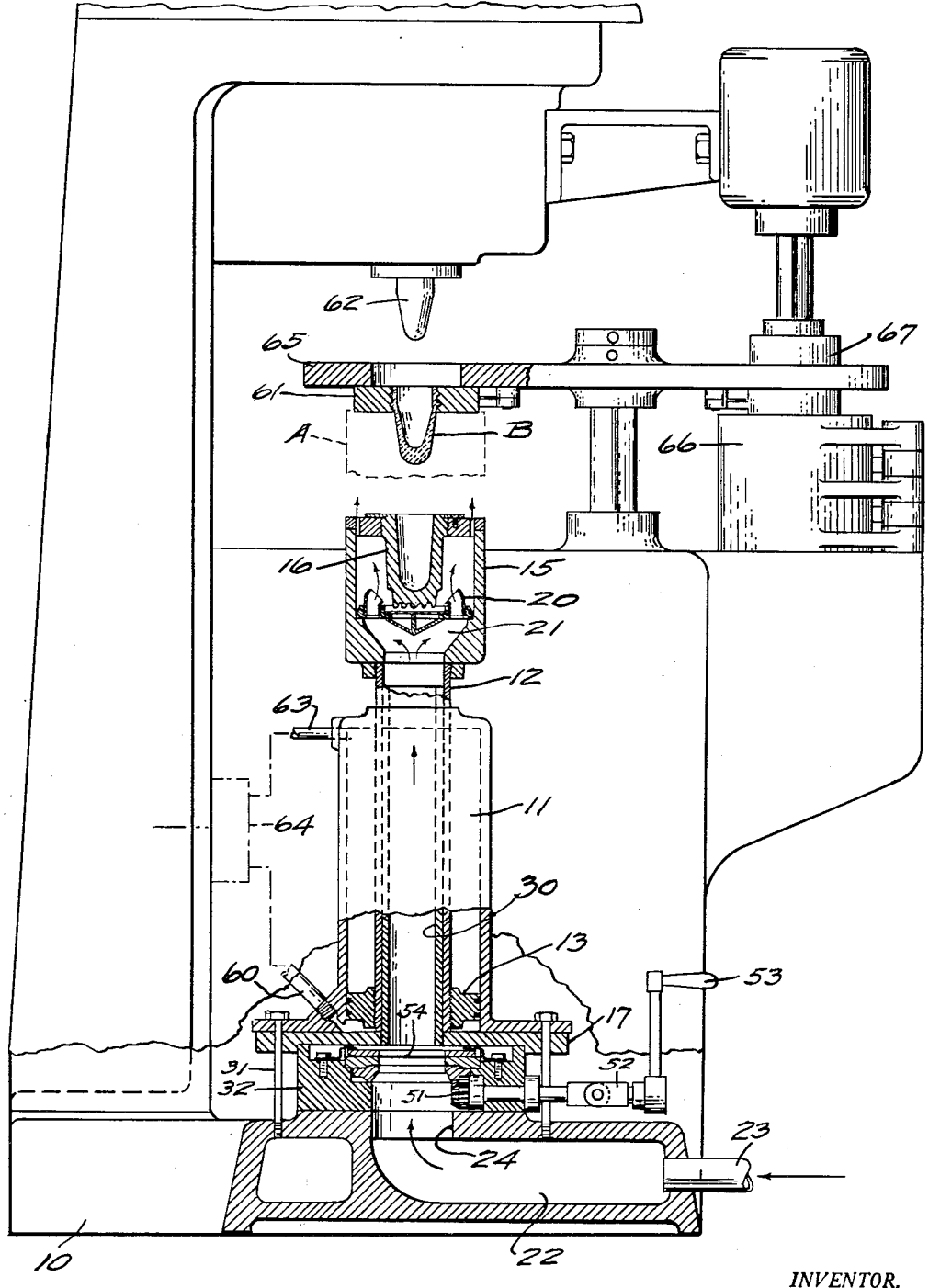
Fig. 1 is a part sectional elevation through a glass forming unit utilizing the present invention.

This present invention is adapted for use in a glass molding machine which may comprise a supporting base, a parison forming mold, a parison transfer unit and a parison blowing mold all adapted to work in coordination to produce blown glass articles and as disclosed in Fig. 1 hereof.

Referring in particular to Fig. 1 of the drawings there is shown such a glass molding unit comprising a base 10 supporting a vertically disposed hydraulic cylinder 11 having a hollow piston rod 12 and its component piston 13. Mounted on the upper end of piston rod 12 is a hollow mold support 15 and inserted therein is a press mold unit 16, the vertical axis of which is in alignment with the axis of the cylinder 11. Mounted within the mold enclosure support member 15 is a series of cooling nozzles 20 equally spaced circumferentially about the vertical axis of mold 16, said nozzles being so shaped and adapted as to apply cooling fluid throughout the entire length and circumference of mold 16. The header space 21 of the enclosure 15 is symmetrical in shape about its vertical axis so that the cooling fluid expands and flows equally in all directions and to each separate nozzle 20.

Formed in the base 10 (see Figs. 1 and 2) is a cooling fluid chamber 22 to which coolant is fed through pipe 23 leading from a blower, compressor or other suitable source of cooling medium. An opening 24 leading from chamber 22 permits the cooling fluid to pass into a vertically disposed hollow stationary member 30 which is attached to ring 17 and arranged in telescopic connection with hollow piston rod 12.

Mounted and clamped between cylinder 11, ring 17 and base 10 by screws 31 and on the vertical axis of cylinder 11, is a valve unit 32 which is constructed and arranged to vary the flow of coolant to the nozzles 20 in such manner that the supply of coolant to each separate nozzle is always alike and in balance as between each nozzle.

This valve unit 32 is of the iris type wherein a series of spring-like blades 35 (Fig. 5) are arranged in overlapping relationship with one end of each blade 35 being attached to a fulcrum pin 36 mounted in a stationary top ring 37 and with each opposite end provided with a pin 40 arranged in a slideway 41 formed in a lower movable ring 42. Each blade 35 is arcuate in shape, the inner radius being at least equal to the radius of the opening through hollow member 30 or opening 24 in base 10, and having a length sufficient to permit it to span either of said mentioned openings. The top ring 37 and blades 35 are held in operable assembled relation by a pair of spring clamps 45 bolted to the valve unit 32 and working against the spring action of blades 35.

Attached to the lower ring 42 is an arcuate section of rack 50 which meshes with a pinion 51 on crank shaft 52. By turning crank 53 the lower ring 42 will be moved in the desired direction about the vertical axis of telescopic member 30 and the blades 35 will move in accordance therewith to open or close the opening 54. Such motion of the blades 35 varies the area of opening 54 equally in all directions, thus permitting an equal flow of coolant, both in volume and direction, upwardly through member 30 to the nozzles 20. With this type of flow control there will not be any deflection of the flow of cooling fluid with its resultant unbalance of delivery and an equal volume and velocity of coolant will prevail at each nozzle 20.

As a consequence the walls of mold 16 will be equally cooled throughout their length and circumference, and the parison of glass B formed therein will also be equally cooled and in balance, thus permitting an exact control of the distribution of glass in the walls of the finally blown glass article.

In operation a charge of glass is positioned in mold 16, air is admitted through pipe 60 under piston 13 moving it and the mold support 15 upwardly to position A and in contact with a neck mold 61. At this position, press plunger 62 moves down into the mold displacing the glass therein into the shape desired and controlled by the molds, such as parison B.

Mold 16 is then moved down by air being admitted through pipe 63 under control of valve 64. The table 65 is indexed and the parison B is positioned in blow mold 66 where a blowhead 67 blows it to final form.

During all of this operating cycle, the coolant flowing through valve unit 32 is continuous and constant and so continues regardless of the position of mold support 15. Thus the walls of mold 16 are continuously under control of the cooling medium and such cooling medium flow may be readily varied during operation by adjustment of the blades 35 in valve 32 to thereby control the mold cooling to any desired degree. Because of the maintenance of the equalized area of the flow opening about the vertical axis of member 30, the fluid as it passes therethrough expands and flows equally in all directions thus giving a positive control of volume and pressure at each and very portion of the conduit 30 and the nozzles 20.

This is particularly true in this instant situation, where velocities in the neighborhood of 9000 ft./minute are utilized because at such velocities the deflections caused by the ordinary gate or butterfly type of valves is disastrous to any possible attainment of a balanced mold cooling.

Without such cooling balance it is not possible to obtain the desired high production per cavity per minute of blown ware and of commercial quality.

Modifications may be resorted to within the spirit and scope of my invention.

I claim:

1. In an apparatus for forming articles from molten glass the combination of a parison forming mold, means supporting said mold and enclosing the side walls thereof, a series of cooling nozzles within said enclosure equally spaced circumferentially about the vertical axis of said mold, a primary cooling duct individual to said mold and extending along the vertical axis thereof, an entrance means at the lower end of said duct having an opening centrally of the vertical axis thereof, and means operable to vary the effective flow area of said opening equally about its vertical axis.

2. In an apparatus for forming articles from molten glass the combination of a mold, a hollow mold supporting member joined with and enclosing the side walls of said mold, a plurality of cooling nozzles mounted within said enclosing member and equally spaced circumferentially about the vertical axis of said mold, said hollow support member being adapted to move said mold to and from its glass forming position and having telescopic connection with a stationary hollow member, cooling fluid supply means connected to said stationary hollow telescoped member, a valve member cooperating with the open end of one of said telescopic members, and means to equally vary the area of the opening of said valve to thereby vary the volume of flow of cooling fluid therethrough.

3. In an apparatus for forming articles from molten glass the combination of a mold, a hollow mold supporting member joined with and enclosing the side walls of said mold, cooling nozzles mounted within said enclosing member and equally spaced circumferentially about the vertical axis of said mold, hydraulic means adapted to move said mold and its hollow supporting member to and from its glass forming position and having telescopic connection with a stationary hollow member, cooling fluid supply means connected to said stationary hollow telescoped member, an iris type valve member cooperating with the entrance end of said stationary telescopic member, and means in said valve operable to equally adjust the area and volume of flow of cooling fluid therethrough.

4. In an apparatus for forming articles from molten glass the combination of a mold, a hollow mold supporting member movable with and enclosing the side walls of said mold, cooling nozzles mounted within said movable enclosing member and equally spaced circumferentially about the vertical axis of said mold, said hollow member being adapted to move said mold vertically to and from its glass forming position and having telescopic connection with a stationary hollow member extending along the vertical axis of said mold, cooling fluid supply means connected to said hollow telescoped members, a valve member having an opening therethrough adapted to cooperate with the lower open end of said stationary telescopic member, and means adapted to equally vary the area of said valve opening about its vertical central axis to thereby adjust the volume of flow of cooling fluid therethrough.

References Cited in the file of this patent

UNITED STATES PATENTS

| | | |
|---|---|---|
| 1,800,191 | Lorenz | Apr. 7, 1931 |
| 2,402,475 | Waterbury et al. | June 18, 1946 |
| 2,649,272 | Barbato | Aug. 18, 1953 |